Oct. 28, 1941.   S. P. BROWN   2,260,432
TESTING APPARATUS
Filed Sept. 14, 1940   2 Sheets-Sheet 2
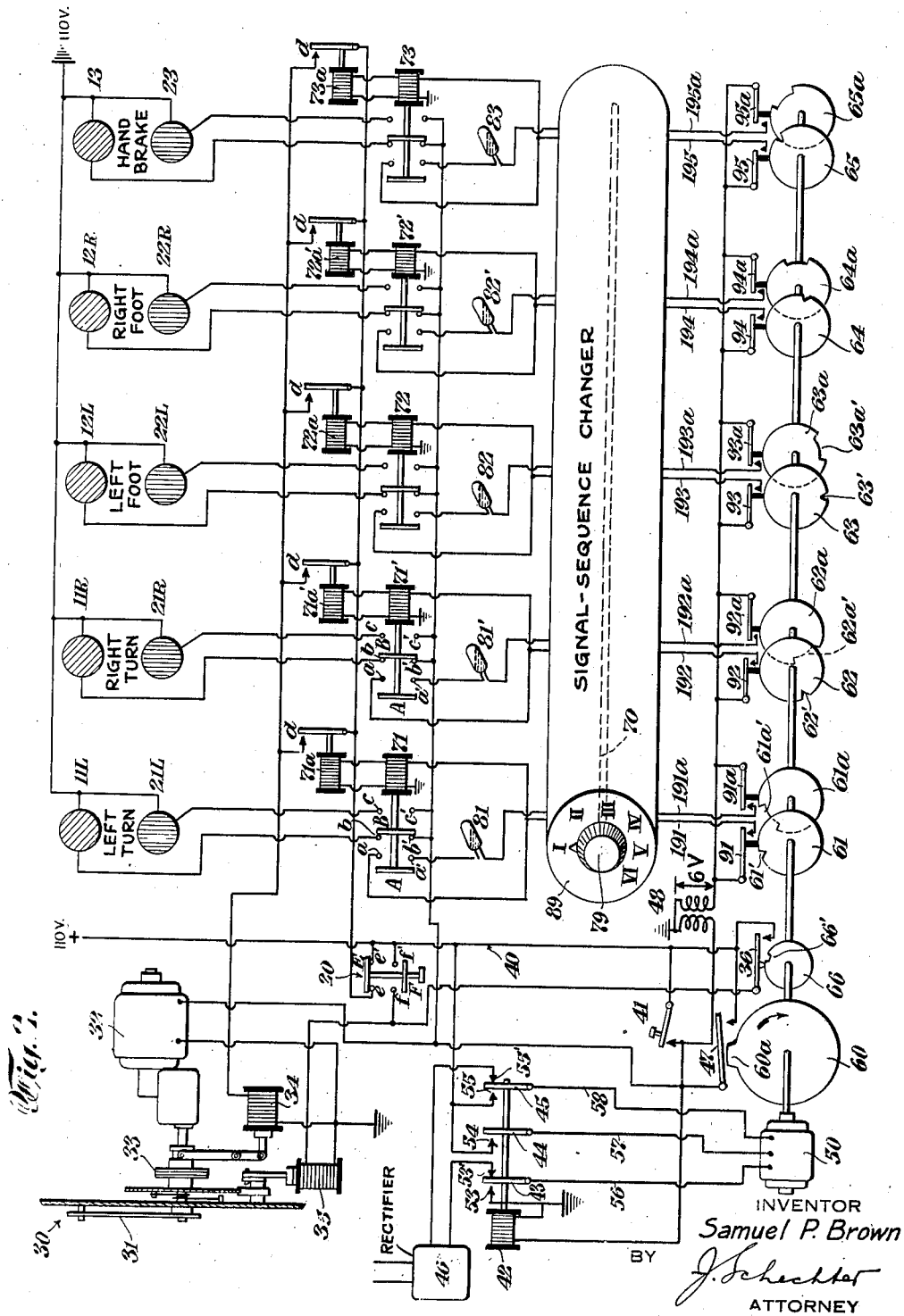
INVENTOR
Samuel P. Brown
BY
J. Schechter
ATTORNEY Patented Oct. 28, 1941

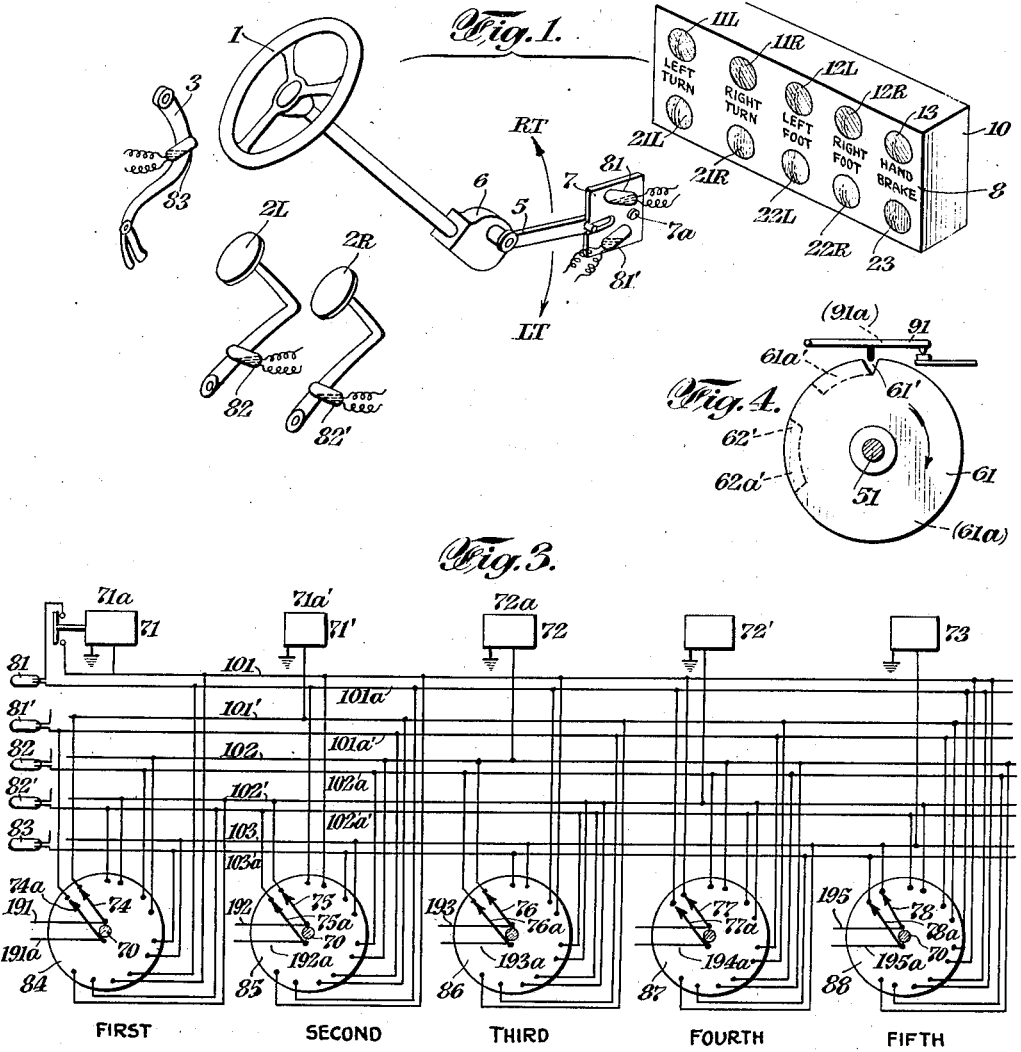

2,260,432

UNITED STATES PATENT OFFICE 2,260,432

TESTING APPARATUS

Samuel P. Brown, Maplewood, N. J., assignor to Delehanty Institute, Inc., New York, N. Y., a corporation of New York Application September 14, 1940, Serial No. 356,737

20 Claims. (Cl. 161—15)

This invention relates to testing apparatus for determining the times of a person's response or reaction to given stimuli. Such reaction testers are used to quantitatively determine a person's adaptability for certain kinds of work or activity, for example, operating an airplane, a motor car or other vehicle or machine. The invention is described with reference to the testing of a person's adaptability for operating a motor car, by testing his time of response or reaction to the flashing of certain lights which indicate that pre-determined acts are required to be performed. But it is clear that the invention may be applied to test adaptability for other types of vehicles or for other or any kind of work or activity, and that stimuli other than the flashing of lights and other called-for acts, may be employed.

One of the objects of the invention is to devise a quantitative testing machine of the class described. A further object of the invention is to devise a machine which shall be sturdy to withstand the rough usage such machines receive and which shall be fool-proof and steady in its operation. For the attainment of these and such other objects as shall hereinafter appear or be pointed out I have shown in the accompanying drawings one embodiment of my invention, wherein:

Fig. 1 is a diagrammatic view, in perspective, of the stimuli signal lamps and the various controls, in the cab of a motor vehicle, which are to be operated in response to the flashing of the stimuli signals;

Fig. 2 is the main electrical circuit diagram;

Fig. 3 is the electrical circuit diagram showing the operation of the signal sequence switches;

Fig. 4 is a detail showing two of the steps cams;

Fig. 5 is a time schedule of operation of certain parts of the machine; and

Fig. 6 is a schedule of signal sequences.

The invention will be described in connection with the testing of the time of response to the flashing of light signals, each of which call for a certain operation in the driving of an automobile, such as the turning of the steering wheel to the left or to the right, the pulling of a hand brake and the stepping on a left or right foot-lever. The person undergoing the test sits in the driver's seat of a dummy vehicle, with his hands on steering wheel 1, Fig. 1, and with his feet on the floor of the cab near left foot lever 2L and right foot lever 2R; to his left is the hand brake 3. Several feet in front of the cab and more or less at the level of the driver's eyes is a signal light box 10 which contains five pairs of lights, each pair of lights comprising a green light (upper) and a red light (lower). These signals are, reading from the left in Fig. 1, the "left turn" green signal 11L and red signal 21L, the "right turn" green signal 11R and red signal 21R, the "left foot" green signal 12L and red signal 22L, the "right foot" green signal 12R and red signal 22R, and the "hand brake" green signal 13 and red signal 23. The acts called for, e. g. "Left turn," "Right turn," etc. are displayed in large letters 8 so that they may be readily seen by the driver in the cab.

An electric clock, designated generally 30 in Fig. 2, is placed in front of the cab and to one side thereof so that it may be seen by both the person undergoing the test in the cab and by the person conducting the test. The clock hand 31, which registers seconds and tenths of a second on the dial, is driven from its synchronous motor 32 through a clutch 33.

The clock motor is normally idle and the clock clutch is normally in disengaged condition. Both the green and the red lights of the signal box 10 are normally dark. Both the signals and the clock are caused to function upon the closing of a starting hand switch 41. This switch is constantly urged by a spring to open condition (as shown in Fig. 2) and is held down for two or three seconds by the person conducting the test, to inaugurate a test cycle.

The first effect of holding starting switch 41 closed for a few seconds is to energize starting relay 42, which has three armature contacts 43, 44 and 45 which, when the relay is un-energized (as shown in Fig. 2) makes with rear contacts 53' and 55'. Energization of the relay causes its armature to move to the left (as viewed in Fig. 2) to break with the rear contacts and make with the front contacts 53, 54 and 55. The circuit to the relay is readily traced from supply line 40, through starting switch 41, through the relay, to ground at the relay. The first effect of energizing the starting relay is to cause rotation of a control motor 50. The circuit to this motor may be traced from supply line 40 to front contact 54, relay contact 44, motor lead 57, through the armature of the motor, motor lead 56, relay contact 43, front contact 53, and to ground. The field circuit to the motor may be traced from supply line 40 to front contact 55, relay contact 45, motor lead 58, motor field, motor lead 56, relay contact 43, front contact 53, and to ground.

The motor is a wound rotor induction motor having a built-in electric brake which instantly stops the motor when direct current is passed through its field. A rectifier 46 supplies D. C. current to the rear contacts 55' and 53' of the relay, so that upon the de-energization of the relay and the rightward (in Fig. 2) return of its armature, a D. C. current is passed to the motor field, the circuit of which may be traced from rear contact 55', relay contact 45, motor lead 58, field of motor, motor lead 56, relay contact 43, rear contact 53', and back to rectifier 46.

Control motor 50 makes a single revolution to rotate cam-shaft 51 upon which are mounted a number of control cams. The first thing that happens upon the start of revolution of the cam-shaft is to establish a holding circuit to the relay 42. For this purpose there is provided on the camshaft a holding cam 60 which has a raised protuberance 60a coacting with a switch 47. This switch is in a circuit to the starting relay 42, which circuit may be traced from supply line 40, switch 47, relay 42, and to ground. In the normal rest condition of the camshaft (as shown in Fig. 2) protuberance 60a of holding cam 60 keeps switch 47 open (as shown). By closing the hand switch 41 current is supplied to motor 50 (as described above) and the camshaft turned clockwise so that 60a leaves switch 47, allowing it to drop and close. Starting switch 41 must be held down a few seconds until the holding switch 47 closes.

Simultaneously with the start of control motor 50, upon the closing of starting switch 41, the green signals 11L, 11R, 12L, 12R and 13 are lighted. The current to these five green lamps and to the five red ones 21L, 21R, 22L, 22R and 23, is under control of five relays 71, 71', 72, 72' and 73. The circuit to the green lamps, say to 11L, may be traced from supply line 40, through starting switch 41 (and, later, through holding switch 47), to lower contact b' of lamp relay 71, through relay contact B, upper contact b, through lamp 11L and to ground. The circuits to the other green lamps may be traced in a similar manner. It is to be noted that the lamp relays are un-energized at this time.

The turning on of the five green lights is an indication that the test is underway. The test comprises a lighting of the red lamps (with a concurrent extinguishing of the corresponding green lamps) one after the other. For example, the first red signal to be given might be red lamp 21L, see Fig. 1, concurrently therewith green lamp 11L is extinguished. This pair of lamps require the driver to make a "left turn," i. e., to turn steering wheel 1 to the left. The red signal remains lighted for a pre-determined period unless sooner extinguished by the driver performing the called-for act. The lighting of the red lamps (and the concurrent extinguishing of the corresponding green lamps) is under control of the five lamp relays 71, 71', 72, 72' and 73, and five pairs of stepped cams, 61 and 61a, 62 and 62a, 63 and 63a, 64 and 64a, and 65 and 65a. These 10 cams are fixed to camshaft 51 in a stepped relation, as will be further described.

Cams 61, 62, 63, 64 and 65 are "starting" cams while their companion cams 61a, 62a, 63a, 64a and 65a are "holding" cams. The starting cams, e. g., cam 61, is provided with a V notch 61' on its periphery, see also Fig. 4. Cooperative with cam 61 is a switch 91 which rests on the periphery of the cam, thus being maintained in open condition (as shown). Upon the rotation of the cam (in a clockwise direction, as seen in Figs. 2 and 4), its notch 61' presently underlies the switch support, so that the switch momentarily closes. Switch 91 is in a circuit to the lamp relay 71, which may be traced from transformer 48 (which drops the voltage to 6 volts), through switch 91, through the signal-sequence changer (which will be later fully described) to lamp relay 71, and to ground. The energization of relay 71 causes a movement of the relay armature (to the right as viewed in Fig. 2) to open the circuit to green lamp 11L (at b'—B—b) and to complete the circuit to red lamp 21L, which may be traced from supply line 40, switch 47, lower contact c', relay contact B, upper contact c, red lamp 21L and to ground.

The closing of switch 91 and the energization of lamp relay 71 is also instrumental in establishing a holding circuit through the relay. The cam 61a which is companion to starting cam 61 and which forms part of the holding circuit, has a recess 61a', see also Fig. 4, which is of considerable length compared to the V-notch 61' of the starting cam 61. A switch 91a rests upon the periphery of holding cam 61a and is normally kept in open condition by the cam, (as shown), being closed only when the cam recess 61a' underlies it. Switch 91a is in the holding circuit which may be traced from supply line 40, switch 47, transformer 48, switch 91a, through the signal-sequence changer, through a mercoid switch 81 in the test cab (which is normally closed), through lower contact a', relay contact A, upper contact a, relay 71 and to ground.

The recess 61a' of holding cam 61a is such that the holding circuit remains closed for a pre-determined length of time. In one test condition which will be used throughout the description of the invention, the holding circuit is kept closed for 3 seconds. That is, the red lamp remains lighted (and the green lamp concurrently remains extinguished) for a full 3 seconds unless the red light is sooner extinguished by the driver. It is for this purpose that the mercoid switch 81 is included in the holding circuit. Mercoid switch 81 is associated with lamps 11L and 21L which are the "left turn" signal, requiring the driver to turn the steering wheel, Fig. 1, to the left. A lever 5 is connected to the steering post by a pair of bevel gears contained in box 6. The distal end of the lever is articulated to a plate 7 which is pivoted at 7a. A left turn on the steering wheel causes a downward turning of lever 5 and plate 7. The mercoid switch 81 is mounted on plate 7 at such an angle that in the normal position of the plate (as shown) mercoid 81 is in circuit-making condition and, when the mounting plate is lowered, is moved to open condition. That is, the holding circuit to the lamp relay 71, Fig. 2, remains completed—to keep the red lamp 21L lighted—until the steering wheel is given a left turn to open mercoid 81 to disrupt the holding circuit to the lamp relay.

If the steering wheel is not given a left turn within 3 seconds, the red lamp will be nevertheless extinguished (and the green lamp re-lighted) at the end of 3 seconds, by the holding cam 61a whose recess 61a' remains under the switch 91a for only 3 seconds; thereafter switch 91a opens to disrupt the holding circuit to lamp relay 71.

For the purpose of the present discussion it will be assumed that the "signal-sequence changer," diagrammatically shown in Fig. 2, is not present, but that switches 91 and 91a are connected in circuit with lamp relay 71 and mercoid 81; that switches 92 and 92a are connected with lamp relay 71' and mercoid 81'; that switches 93 and 93a are connected with lamp relay 72 and mercoid 82, etc. as shown by the dot-and-dash lines in Fig. 2. The mercoid 81', associated with the "right turn" lamps is mounted, with mercoid 81, on plate 7, Fig. 1 and is likewise normally in circuit-making condition (as shown) but adapted to be broken when the mounting plate is turned upwardly, which occurs when the wheel is given a right turn. The mercoid 82, associated with the "left foot" lamps, is mounted on the left foot lever 2L, and is in circuit-making condition when the lever is in normal, raised position (as shown in Fig. 1). The mercoid 82', associated with the "right foot" lamps is mounted on the right foot lever 2R, Fig. 1. The mercoid 83, associated with the "hand brake" lamps, is mounted on the band brake 3 and is opened when the hand brake is pulled forward.

It is assumed, as above stated, for the purpose of this description, that the signal-sequence changer is not present in the electrical diagram of Fig. 2. That is, the order of operation will be assumed to be first, the "left turn" signal 21L under control of its relay 71, mercoid 81 and control cams 61 and 61a; second, the "right turn" signal 21R under control of its relay 71', mercoid 81' and control cams 62 and 62a, third, the "left foot" signal 22L under control of its relay 72, mercoid 82 and control cams 63 and 63a, etc. as shown in Fig. 2. It is thus seen that the pair of cams 62 and 62a must be stepped back relatively to cams 61 and 61a so as to come into operation after the latter cams have performed. This stepping is diagrammatically shown in Fig. 2 by the stepped angular positions of the V-notches of the starting cams 61 to 65 and the recesses of the holding cams 61a to 65a, see also Fig. 4. The stepping of the pairs of cams is also shown on the schedule of Fig. 5, wherein time in seconds runs rightwardly. Cam 60, the operation of which is represented by the long horizontal top line, closes the holding circuit to the control motor 50 one second after the closing of hand switch 41. The closing of switch 41 is considered as zero time. At 3 seconds, the starting cam 61 and holding cam 61a came into operation; cam 61 closes its switch 91 for but ¼ second (V-notch 61') while cam 61a holds its switch 91a closed for 3 seconds (recess 61a'). After the opening of switch 91a, there is a lapse of 1½ seconds before the next pair of cams 62 and 62a (with their switches 92 and 92a) come into operation.

The object of the test is to determine precisely how much time the driver consumes in responding to the various signals. For example, the driver is required to make a "left turn" immediately upon the lighting of red lamp 21L. As soon as he has made the "left turn" (unless, of course, he fails to do so before the time limit of 3 seconds), the red light is extinguished. That is, the time that red lamp 21L remains lighted is a measure of the driver's time of response or reaction to the given signal. Hence the hand 31 of clock 30 turns only during the time that the red lamps remain lighted. As described above, red lamp 21L remains lighted so long as lamp relay 71 is energized, similarly with red lamp 21R and relay 71', lamp 22L and relay 72, etc. Hence clock relay 71a is placed in parallel with lamp relay 71 to be energized concurrently therewith, clock relay 71a' is placed in parallel with lamp relay 71', relay 72a with relay 72 etc. The clock relays, like the lamp relays, are normally in unenergized condition with their respective switch contacts d in open condition (as shown in Fig. 2). The clock relays are connected to the clock clutch magnet 34. As heretofore explained, the clock hand is normally disconnected from the clock motor 32 and is driven thereby only when clutch magnet 34 is energized. The circuit from clock relay 71a to the clutch magnet may be traced from supply line 40, through re-set switch 20 (which will be subsequently described), through relay contact d, through the clutch magnet 34 to ground. The hand of the clock being driven only so long as each of the red lamps remain lighted, the hand will register the total test time (in seconds and tenths), that is, the total time the five red signals remained displayed.

The clock motor 32 is supplied with current only during the time the test is underway. It is therefore placed in parallel to the switch 47. The circuit to the clock motor may be traced from supply line 40, switch 47, motor 32 and to ground.

It is required to re-set the clock hand to zero at the conclusion of each test. For this purpose there is provided a resetting magnet 35 which operates a conventional zeroizing or resetting mechanism (shown diagrammatically in Fig. 2). A resetting cam 66 is secured on camshaft 51 and has a cooperative switch 36 riding on the periphery of the cam. Switch 36 is normally open except when notch 66' of the cam comes under the switch, which drops to close the circuit. Switch 36 is in the resetting circuit which may be traced from supply line 40, switch 36, resetting magnet 35, and to ground. Resetting cam is the last of the stepped cams to come into operation.

It may be desired to re-set the clock manually. For this purpose a hand resetting switch 20 is provided. In order to prevent the resetting mechanism to come into operation at a time that the clutch magnet 34 is energized to cause a driving of the clock hand, the manual re-set switch 20 is designed to break the clutch magnet circuit before completing the circuit to re-set magnet 35. For this purpose the re-set switch has two plates E and F. In the normal condition of the switch (as shown in Fig. 2) its plate E makes with fixed contacts e and e' in the circuit to the clutch magnet. When it is desired to re-set, switch 20 is pushed upwardly (as viewed in Fig. 2) to break contacts e—E—e' and to cause switch plate F to make contact with f and f' which are in the circuit to resetting magnet 35.

It is undesirable to conduct the test with the various stimuli signals recurring in a fixed order, because the person undergoing the test will soon be aware of the order or sequence of events and will, consciously or subconsciously, anticipate their occurrence. Hence the accumulated test time will not be a true account of the person's reaction or response. It is for this reason that a signal-sequence changer, Fig. 2, is provided between the circuits associated with the lamps, the lamp and clock relays and the cab mercoid switches, on the one hand, and the circuits associated with the stepped cam controlled switches 91 and 91a to 95 and 95a, on the other hand. The sequence changer is under control of the person conducting the test who may select any desired sequence arrangement (for which the machine may have been designed) by pre-setting a selector knob 79. Selector knob 79 is secured on a shaft 70.

Any number of sequences or order arrangements may be provided. Six arrangements are shown, Figs. 3 and 6. The person conducting the test may select any arrangement by turning the selector knob preparatory to closing starting switch 41. The six order arrangements or settings are conveniently designated from I to VI, see Fig. 6. For example, setting I will have the following order or sequence of signals: first, right turn (R. T.), second, right foot (R. F.), third, left foot (L. F.), fourth, left turn (L. T.), and fifth, hand brake (H. B.). In order that the person conducting the test may know which sequence to select (although the particular one selected is of no importance, so long as the person undergoing the test does not know what the sequence will be), there are provided indicia I to VI, on dial plate 89.

Also mounted on shaft 70 with selector knob 79 are five pairs of adjustable contact arms, 74 and 74a, 75 and 75a, 76 and 76a, 77 and 77a, and 78 and 78a, see Fig. 3. By turning selector knob 79, all ten contact arms are turned in unison. As shown in Fig. 3, which represents setting I, the ten contacts make with the first pair of contacts on their respective contact dials, 84 to 88. For example, contact arm 74a makes with a contact leading to a bus wire 101a' which leads to cab mercoid switch 81' associated with the right turn (R. T.) signal. Companion contact arm 74 makes with a contact leading to bus wire 101' which leads to lamp relay 71' and clock relay 71a', associated with the right turn (R. T.) signal. The next pair of contact arms, 75a and 75, lead, respectively, to bus wires 102a' and 102', leading, respectively to cab mercoid 82' and relays 72' and 72a' associated with the right foot (R. F.) signal, etc.

A pair of leads 191 and 191a, see Figs. 3 and 2, lead from cam control switches, respectively, 91 and 91a, to the first pair of contact arms, respectively 74 and 74a. A second pair of leads 192 and 192a lead from cam control switches, respectively, 92 and 92a, to the second pair of contact arms, respectively, 75 and 75a, etc. It will be clear that electrical current is always supplied to the switches 91 and 91a to 95 and 95a in the order, from left to right, shown in Fig. 2, and that this current is always supplied to the leads 191 and 191a to 195 and 195a, see Fig. 3, in the same order, from left to right, as shown in that figure. That is, electrical current is supplied to the pairs of contact arms 74 and 74a to 78 and 78a in the order shown, from left to right. The order of signal sequence, however, depends upon the particular order selected. For example, in setting I of Fig. 3, the first current impulse received at the first pair of contact arms 74 and 74a is effective to energize the lamp relay 71' and the clock relay 71a'. This, as already described above, causes the extinguishing of green signal 11R and the light of the red signal 21R, associated with the "right turn" stimuli. A branch circuit (the bus wire 101a') leads to the mercoid switch 81', see also Fig. 2, which is opened by making a right turn on the steering wheel, Fig. 1, to extinguish the red light and to stop the turning of the clock hand (relays 71' and 71a'). The second current is supplied to the second pair of contact arms 75 and 75a which, in setting I (as shown), leads to the relays and mercoid switch associated with the right foot (R. F.) stimuli, etc.

Frequently a person undergoing the test, after having received the first four stimuli will be able, by process of elimination, to anticipate the fifth and last stimulus. To forestall such persons from attempting this procedure, one or more arrangements may be provided in which one of the signals or stimuli is repeated and the fifth one not used at all.

I claim:

1. In a device of the class described having a plurality of stimuli signals each comprising an alert lamp and a command lamp, a like plurality of manipulative devices required to be operated in response to the said command lamps, and a clock, the combination of a camshaft, a control motor, a number of pairs of cams equal to the said plurality of stimuli signals and manipulative devices, each pair of cams comprising a starting cam provided with a short recess and a holding cam provided with a long recess, a plurality of switches closed by the said starting and holding cams, the said starting and holding cams being mounted on the said camshaft in stepped relation whereby the said plurality of cam switches are sequentially closed, a plurality of signal relays each controlling individual circuits to the alert and command lamps of one pair of stimuli signals, the circuit to the alert lamp being closed, and the circuit to the command lamp being open, in the de-energized condition of the associated signal relay, the said clock having a motor and a clutch-connected hand, a solenoid for operating the clutch, a plurality of relays each in parallel with one of the said plurality of signal relays and connected to the said clock-hand clutch solenoid, a master holding cam on the said camshaft, a control motor relay, a holding switch in circuit with the control motor relay and normally maintained in open condition by the said master holding cam, a manual starting switch adapted to supply current to the said control motor relay and thereby to the said control motor causing the said master holding cam to close the said holding switch whereby current to the control motor is supplied for a complete revolution, the said manual starting switch and the said holding switch being adapted to supply current to the said lamps and relays and to the said clock motor whereby the said plurality of alert lamps are lighted and the clock motor started, a holding circuit associated with each of the said plurality of signal and clock relays, a plurality of normally closed mercoid switches in the said individual holding circuits adapted to be opened by the said plurality of manipulative devices, a signal-sequence changer having a number of selective arrangements of signal sequences interposed between the said plurality of cam switches and the said plurality of signal and clock relays and mercoid switches, the starting cam switches being connected in individual circuits with the said signal and clock relays through the said changer whereby the said relays are energized and their associated command lamps lighted (and the corresponding alert lamps concurrently extinguished) in a sequence depending upon the setting of the said changer, and the said clock solenoid energized to operate the clock-hand clutch, the said holding cam switches being connected in the said individual holding circuits through the said changer whereby the said relays are held energized each for a pre-determined time, to maintain their respective command lamps lighted and the clock clutch solenoid energized for the said pre-determined time, each of the said manipulative devices being adapted to disrupt its associated holding circuit to de-energize the relays thereof and thereby to extinguish its associated command lamp (and to relight the corresponding alert lamp) and to de-clutch the clock hand whereby the latter registers the cumulative time the command lamps remain lighted.

2. In a device of the class described having a plurality of stimuli signals each comprising an alert lamp and a command lamp, a like plurality of manipulative devices required to be operated in response to the said command lamps and a clock, the combination of a camshaft, a control motor, a number of cams equal to the said plurality of stimuli signals and manipulative devices, a plurality of switches closed by the said cams, the said cams being mounted on the said camshaft in stepped relation whereby the said plurality of cam switches are sequentially closed, a plurality of signal relays each controlling individual circuits to the alert and command lamps of one pair of stimuli signals, the circuit to the alert lamp being closed, and the circuit to the command lamp being open, in the deenergized condition of the associated signal relay, the said clock having a motor and a clutch-connected hand, a solenoid for operating the clutch, a plurality of relays each in parallel with one of the said plurality of signal relays and connected to the said clock-hand clutch solenoid, a master holding cam on the said camshaft, a control motor relay, a holding switch in circuit with the control motor relay and normally maintained in open condition by the said master holding cam, a manual starting switch adapted to supply current to the said control motor relay and thereby to the said control motor causing the said master holding cam to close the said holding switch whereby the current to the control motor is supplied for a complete revolution, the said manual starting switch and the said holding switch being adapted to supply current to the said lamps and relays and to the said clock motor whereby the said plurality of alert lamps are lighted and the clock motor started, a holding circuit associated with each of the said plurality of signal and clock relays, a plurality of normally closed mercoid switches in the said individual holding circuits adapted to be opened by the said plurality of manipulative devices, a signal-sequence changer having a number of selective arrangements of signal sequences interposed between the said plurality of cam switches and the said plurality of signal and clock relays and mercoid switches, the said cam switches being connected in individual circuits with the said signal and clock relays through the said changer whereby the said relays are energized and their associated command lamps lighted (and the corresponding alert lamps concurrently extinguished) in a sequence depending upon the setting of the said changer, and the said clock solenoid energized to operate the clock-hand clutch, each of the said manipulative devices being adapted to disrupt its associated holding circuit to de-energize the relays thereof and thereby to extinguish its associated command lamp (and to re-light the corresponding alert lamp) and to de-clutch the clock hand whereby the latter registers the cumulative time the command lamps remain lighted.

3. In a device of the class described having a plurality of stimuli signals each comprising an alert lamp and a command lamp, a like plurality of manipulative devices required to be operated in response to the said command lamps and a clock, the combination of a camshaft, a control motor, a number of pairs of cams equal to the said plurality of stimuli signals and manipulative devices, each pair of cams comprising a starting cam provided with a short recess and a holding cam provided with a long recess, a plurality of switches closed by the said starting and holding cams, the said starting and holding cams being mounted on the said camshaft in stepped relation whereby the said plurality of cam switches are sequentially closed, a plurality of signal relays each controlling individual circuits to the alert and command lamps of one pair of stimuli signals, the circuit to the alert lamp being closed, and the circuit to the command lamp being open, in the de-energized condition of the associated signal relay, the said clock having a motor and a clutch-connected hand, a solenoid for operating the clutch, a plurality of relays each in parallel with one of the said plurality of signal relays and connected to the said clock-hand clutch solenoid, a master holding cam on the said camshaft, a control motor relay, a holding switch in circuit with the control motor relay and normally maintained in open condition by the said master holding cam, a manual starting switch adapted to supply current to the said control motor relay and thereby to the said control motor causing the said master holding cam to close the said holding switch whereby the current to the control motor is supplied for a complete revolution, the said manual starting switch and the said holding switch being adapted to supply current to the said lamps and relays and to the said clock motor whereby the said plurality of alert lamps are lighted and the clock motor started, a holding circuit associated with each of the said plurality of signal and clock relays, a plurality of normally closed mercoid switches in the said individual holding circuits adapted to be opened by the said plurality of manipulative devices, the starting cam switches being connected in individual circuits with the said signal and clock relays whereby the said relays are energized and their associated command lamp sequentially lighted and the corresponding alert lamp concurrently extinguished and the said clock solenoid energized to operate the clock-hand clutch, the said holding cam switches being connected in the said individual holding circuits whereby the said relays are held energized each for a pre-determined time, to maintain their respective command lamps lighted and the clock clutch solenoid energized for the said pre-determined time, each of the said manipulative devices being adapted to disrupt its associated holding circuit to de-energize the relays thereof and thereby to extinguish its associated command lamp (and to relight the corresponding alert lamp) and to de-clutch the clock hand whereby the latter registers the cumulative time the command lamps remain lighted.

4. In a device of the class described having a plurality of stimuli signals each comprising an alert lamp and a command lamp, a like plurality of manipulative devices required to be operated in response to the said command lamps and a clock, the combination of a camshaft, a control motor, a number of pairs of cams equal to the said plurality of stimuli signals and manipulative devices, each pair of cams comprising a starting cam provided with a short recess and a holding cam provided with a long recess, a plurality of switches closed by the said starting and holding cams, the said starting and holding cams being mounted on the said camshaft in stepped relation whereby the said plurality of cam switches are sequentially closed, a plurality of signal relays each controlling individual circuits to the alert and command lamps of one pair of stimuli signals, the circuit to the alert lamp being closed, and the circuit to the command lamp being open, in the de-energized condition of the associated signal relay, a plurality of clock controlling relays each in parallel with one of the said plurality of signal relays, a master holding cam on the said camshaft, a control motor relay, a holding switch in circuit with the control motor relay and normally maintained in open condition by the said master holding cam, a manual starting switch adapted to supply current to the said control motor relay and thereby to the said control motor causing the said master holding cam to close the said holding switch whereby the current to the control motor is supplied for a complete revolution, the said starting switch and the said holding switch being adapted to supply current to the said lamps and relays and to the said clock motor whereby the said plurality of alert lamps are lighted and the clock motor started, a holding circuit associated with each of the said plurality of signal and clock relays, a plurality of normally closed mercoid switches in the said individual holding circuits adapted to be opened by the said plurality of manipulative devices, a signal-sequence changer having a number of selective arrangements of signal sequences interposed between the said plurality of cam switches and the said plurality of signal and clock relays and mercoid switches, the starting cam switches being connected in individual circuits with the said signal and clock relays through the said changer whereby the said relays are energized and their associated command lamps lighted (and the corresponding alert lamps concurrently extinguished) in a sequence depending upon the setting of the said changer, and the said clock operated, the said holding cam switches being connected in the said individual holding circuits through the said changer whereby the said relays are held energized each for a pre-determined time, to maintain their respective command lamps lighted and the clock motor operated for the said pre-determined time, each of the said manipulative devices being adapted to disrupt its associated holding circuit to de-energize the relays thereof and thereby to extinguish its associated command lamp (and to re-light the corresponding alert lamp) and to stop the clock whereby the latter registers the cumulative time the command lamps remain lighted.

5. In a device of the class described having a plurality of stimuli signals each comprising an alert lamp and a command lamp, a like plurality of manipulative devices required to be operated in response to the said command lamps and a clock, the combination of a camshaft, a control motor adapted to impart a complete revolution thereto, a number of pairs of cams equal to the said plurality of stimuli signals and manipulative devices, each pair of cams comprising a starting cam provided with a short recess and a holding cam provided with a long recess, a plurality of switches closed by the said starting and holding cams, the said starting and holding cams being mounted on the said camshaft in stepped relation whereby the said plurality of cam switches are sequentially closed, a plurality of signal relays each controlling individual circuits to the alert and command lamps of one pair of stimuli signals, the circuit to the alert lamp being closed, and the circuit to the command lamp being open, in the un-energized condition of the associated signal relay, the said clock having a motor and a clutch-connected hand, a solenoid for operating the clutch, a plurality of relays each in parallel with one of the said plurality of signal relays and connected to the said clock-hand clutch solenoid, a manual starting switch adapted to supply current to the said lamps and relays and to the said control and clock motors whereby the said plurality of alert lamps are lighted and the clock motor started, a holding circuit associated with each of the said plurality of signal and clock relays, a plurality of normally closed mercoid switches in the said individual holding circuits adapted to be opened by the said plurality of manipulative devices, a signal-sequence changer having a number of selective arrangements of signal sequences interposed between the said plurality of cam switches and the said plurality of signal and clock relays and mercoid switches, the starting cam switches being connected in individual circuits with the said signal and clock relays through the said changer whereby the said relays are energized and their associated command lamps lighted (and the corresponding alert lamps concurrently extinguished) in a sequence depending upon the setting of the said changer and the said clock solenoid energized to operate the clock-hand clutch, the said holding cam switches being connected in the said individual holding circuits through the said changer whereby the said relays are held energized each for a pre-determined time, to maintain their respective command lamps lighted and the clock clutch solenoid energized for the said pre-determined time, each of the said manipulative devices being adapted to disrupt its associated holding circuit to de-energize the relays thereof and thereby to extinguish its associated command lamp (and to re-light the corresponding alert lamp) and to de-clutch the clock hand whereby the latter registers the cumulative time the command lamps remain lighted.

6. In a device of the class described having a plurality of stimuli signals each comprising an alert lamp and a command lamp, a like plurality of manipulative devices required to be operated in response to the said command lamps, and a clock, the combination of a camshaft, a control motor designed to impart a complete revolution thereto, a number of cams equal to the said plurality of stimuli signals and manipulative devices, a plurality of switches closed by the said cams, the said cams being mounted on the said camshaft in stepped relation whereby the said plurality of cam switches are sequentially closed, a plurality of signal relays each controlling individual circuits to the alert and command lamps of one pair of stimuli signals, the circuit to the alert lamp being closed, and the circuit to the command lamp being open, in the de-energized condition of the associated signal relay, a plurality of clock controlling relays each in parallel with one of the said plurality of signal relays, a manual starting switch adapted to supply current to the said lamps and relays and to the said control and clock motors whereby the said plurality of alert lamps are lighted and the clock motor started, a holding circuit associated with each of the said plurality of signal and clock relays, a plurality of normally closed mercoid switches in the said individual holding circuits adapted to be opened by the said plurality of manipulative devices, a signal-sequence changer having a number of selective arrangements of signal sequences interposed between the said plurality of cam switches and the said plurality of signal and clock relays and mercoid switches, the said cam switches being connected in individual circuits with the said signal and clock relays through the said changer whereby the said relays are energized and their associated command lamp lighted (and the corresponding alert lamp concurrently extinguished) in a sequence depending upon the setting of the said changer, and the said clock operated for a pre-determined time, each of the said manipulative devices being adapted to disrupt its associated holding circuit to de-energize the relays thereof and thereby to extinguish its associated command lamp (and to re-light the corresponding alert lamp) and to stop the clock whereby the latter registers the cumulative time the command lamps remained lighted.

7. In a device of the class described having a plurality of stimuli signals each comprising an alert lamp and a command lamp, a like plurality of manipulative devices required to be operated in response to the said command lamps, and a clock, the combination of a camshaft, a control motor, a number of cams equal to the said plurality of stimuli signals and manipulative devices, a plurality of switches closed by the said cams, the said cams being mounted on the said camshaft in stepped relation whereby the said plurality of cam switches are sequentially closed, a plurality of signal relays each controlling individual circuits to the alert and command lamps of one pair of stimuli signals, the circuit to the alert lamp being closed, and the circuit to the command lamp being open, in the de-energized condition of the associated signal relay, a plurality of clock controlling relays each in parallel with one of the said plurality of signal relays, a holding cam mounted on the said camshaft, a control motor relay, a holding switch in circuit with the control motor relay normally maintained in open condition by the said holding cam, a manual starting switch adapted to supply current to the said control motor relay and thereby to the said control motor causing the said holding cam to close the said holding switch whereby current to the control motor is supplied for a complete revolution, the said manual starting switch and the said holding switch being adapted to supply current to the said lamps and relays and to the said clock motor whereby the said plurality of alert lamps are lighted and the clock motor started, a holding circuit associated with each of the said plurality of signal and clock relays, a plurality of normally closed mercoid switches in the said individual holding circuits adapted to be opened by the said plurality of manipulative devices, a signal-sequence changer having a number of selective arrangements of signal-sequences interposed between the said plurality of cam switches and the said plurality of signal and clock relays and mercoid switches, the said cam switches being connected in individual circuits with the said signal and clock relays through the said changer whereby the said relays are energized and their associated command lamps lighted (and the corresponding alert lamps concurrently extinguished) in a sequence depending upon the setting of the said changer, and the said clock operated for a pre-determined time, each of the said manipulative devices being adapted to disrupt its associated holding circuit to de-energize the relays thereof and thereby to extinguish its associated command lamp (and to relight the corresponding alert lamp) and to stop the clock whereby the latter registers the cumulative time the command lamps remain lighted.

8. In a device of the class described having a plurality of stimuli signals each comprising an alert lamp and a command lamp, a like plurality of manipulative devices required to be operated in response to the said command lamps, and a clock, the combination of a camshaft, a control motor designed to impart a complete revolution thereto, a number of cams equal to the said plurality of stimuli signals and manipulative devices, a plurality of switches closed by the said cams, the said cams being mounted on the said camshaft in stepped relation whereby the said plurality of cam switches are sequentially closed, a plurality of signal relays each controlling individual circuits to the alert and command lamps of one pair of stimuli signals, the circuit to the alert lamp being closed, and the circuit to the command lamp being open, in the de-energized condition of the associated signal relay, the said clock having a motor and a clutch-connected hand, a solenoid for operating the clutch, a plurality of relays each in parallel with one of the said plurality of signal relays and connected to the said clock-hand clutch solenoid, a manual starting switch adapted to supply current to the said lamps and relays and thereby to the said control and clock motor whereby the said plurality of alert lamps are lighted and the clock motor started, a holding circuit associated with each of the said plurality of signal and clock relays, a plurality of normally closed mercoid switches in the said individual holding circuits adapted to be opened by the said plurality of manipulative devices, a signal-sequence changer having a number of selective arrangements of signal sequences interposed between the said plurality of cam switches and the said plurality of signal and clock relays and mercoid switches, the said cam switches being connected in individual circuits with the said signal and clock relays through the said changer whereby the said relays are energized and their associated command lamps lighted (and the corresponding alert lamps concurrently extinguished) in a sequence depending upon the setting of the said changer, and the said clock solenoid energized to operate the clock-hand clutch, for a predetermined time, each of the said manipulative devices being adapted to disrupt its associated holding circuit to de-energize the relays thereof and thereby to extinguish its associated command lamp (and to re-light the corresponding alert lamp) and to de-clutch the clock hand whereby the latter registers the cumulative time the command lamps remain lighted.

9. In a device of the class described having a plurality of stimuli signals each comprising an alert lamp and a command lamp, a like plurality of manipulative devices required to be operated in response to the said command lamps, and a clock, the combination of a camshaft, a control motor designed to impart a complete revolution thereto, a number of cams equal to the said plurality of stimuli signals and manipulative devices, a plurality of switches closed by the said cams, the said cams being mounted on the said camshaft in stepped relation whereby the said plurality of cam switches are sequentially closed, a plurality of signal relays each controlling individual circuits to the alert and command lamps of one pair of stimuli signals, the circuit to the alert lamp being closed, and the circuit to the command lamp being open, in the de-energized condition of the associated signal relay, a plurality of clock controlling relays each in parallel with one of the said plurality of signal relays, a manual starting switch adapted to supply current to the said lamps and relays and to the said control and clock motor whereby the said plurality of alert lamps are lighted and the clock motor started, a holding circuit associated with each of the said plurality of signal and clock relays, a plurality of normally closed mercoid switches in the said individual holding circuits adapted to be opened by the said plurality of manipulative devices, a signal-sequence changer having a number of selective arrangements of signal sequences interposed between the said plurality of cam switches and the said plurality of signal and clock relays and mercoid switches, the said cam switches being connected in individual circuits with the said signal and clock relays through the said changer whereby the said relays are energized and their associated command lamps lighted (and the corresponding alert lamps concurrently extinguished) in a sequence depending upon the setting of the said changer, and the said clock operated for a predetermined time, each of the said manipulative devices being adapted to disrupt its associated holding circuit to de-energize the relays thereof and thereby to extinguish its associated command lamp (and to re-light the corresponding alert lamp) and to stop the clock whereby the latter registers the cumulative time the command lamps remained lighted, a clock resetting means, and a cam mounted on the said camshaft for operating the said resetting means at the conclusion of the camshaft revolution.

10. In a device of the class described having a plurality of stimuli signals each comprising an alert lamp and a command lamp, a like plurality of manipulative devices required to be operated in response to the said command lamps, and a clock, the combination of a camshaft, a control motor designed to impart a complete revolution thereto, a number of cams equal to the said plurality of switches closed by the said cams, the said cams being mounted on the said camshaft in stepped relation whereby the said plurality of cam switches are sequentially closed, a plurality of signal relays each controlling individual circuits to the alert and command lamps of one pair of stimuli signals, the circuit to the alert lamp being closed, and the circuit to the command lamp being open, in the de-energized condition of the associated signal relay, a plurality of clock controlling relays each in parallel with one of the said plurality of signal relays, a manual starting switch adapted to supply current to the said lamps and relays and thereby to the said control and clock motor whereby the said plurality of alert lamps are lighted and the clock motor started, a holding circuit associated with each of the said plurality of signal and clock relays, a plurality of normally closed mercoid switches in the said individual holding circuits adapted to be opened by the said plurality of manipulative devices, the said cam switches being connected in individual circuits with the said signal and clock relays whereby the said relays are energized and their associated command lamps sequentially lighted (and the corresponding alert lamps concurrently extinguished), and the said clock operated for a pre-determined time, each of the said manipulative devices being adapted to disrupt its associated holding circuit to de-energize the relays thereof and thereby to extinguish its associated command lamp (and to relight the corresponding alert lamp) and to stop the clock whereby the latter registers the cumulative time the command lamps remain lighted.

11. In a device of the class described having a plurality of pairs of stimuli signals each pair comprising an alert lamp and a command lamp, a like plurality of manipulative devices required to be operated in response to the said command lamps, and a clock, the combination of a camshaft, a motor designed to impart a complete revolution thereto, a number of pairs of cams equal to the said plurality of stimuli signals and manipulative devices, mounted in stepped relation on the camshaft, each pair of stepped cams comprising a starting cam provided with a short recess and a holding cam provided with a long recess, a plurality of switches closed by the said starting and holding cams, a plurality of signal relays each controlling individual circuits to the alert and command lamps of one pair of stimuli signals, the circuit to the alert lamp being closed, and the circuit to the command lamp being open, in the de-energized condition of the associated signal relay, a plurality of clock controlling relays each in parallel with one of the said plurality of signal relays, the said starting cam switches being in individual circuits with the said signal and clock relays whereby the said relays are sequentially energized and their associated command lamps sequentially lighted and the corresponding alert lamps concurrently extinguished and the said clock sequentially operated, a holding circuit associated with each of the said plurality of signal and clock relays, the said holding cam switches being in the said individual holding circuits whereby the said relays are sequentially held energized each for a pre-determined time, to maintain their respective command lamps lighted and to operate the clock for the period of relay energization, a plurality of normally closed mercoid switches opened by the said plurality of manipulative devices, in the said individual holding circuits whereby operation of a manipulative device disrupts its associated holding circuit to un-energize the relay thereof and to extinguish its associated command lamp and to re-light the corresponding alert lamp and to stop the operation of the clock.

12. In a device of the class described having a plurality of pairs of stimuli signals each pair comprising an alert lamp and a command lamp, a like plurality of manipulative devices required to be operated in response to the said command lamps, and a clock, the combination of a camshaft, a motor designed to impart a complete revolution thereto, a number of cams equal to the said plurality of stimuli signals and manipulative devices, mounted in stepped relation on the camshaft, a plurality of switches closed by the said cams, a plurality of signal relays each controlling individual circuits to the alert and command lamps of one pair of stimuli signals, the circuit to the alert lamp being closed, and the circuit to the command lamp being open, in the de-energized condition of the associated signal relay, a plurality of clock controlling relays each in parallel with one of the said plurality of signal relays, the said cam switches being in individual circuits with the said signal and clock relays whereby the said relays are sequentially energized and their associated command lamp sequentially lighted and the corresponding alert lamp concurrently extinguished and the said clock sequentially operated for a pre-determined time, a holding circuit associated with each of the said plurality of signal and clock relays, a plurality of normally closed mercoid switches in the said individual holding circuits opened by the said plurality of manipulative devices, whereby operation of a manipulative device disrupts its associated holding circuit to de-energize the relay thereof and to extinguish its associated command lamp and to re-light the corresponding alert lamp and to stop the operation of the clock.

13. In a device of the class described having a plurality of pairs of stimuli signals each pair comprising an alert lamp and a command lamp, a like plurality of manipulative devices required to be operated in response to the said command lamps, and a clock, the combination of a camshaft, a motor designed to impart a complete revolution thereto, a number of cams equal to the said plurality of stimuli signals and manipulative devices, a plurality of switches closed by the said cams, the said cams being mounted on the said camshaft in stepped relation whereby the said plurality of cam shafts are sequentially closed, a plurality of signal relays each controlling individual circuits to the alert and command lamps of one pair of stimuli signals, the circuit to the alert lamp being closed, and the circuit to the command lamp being open, in the de-energized condition of the associated signal relay, a plurality of clock controlling relays each in parallel with one of the said plurality of signal relays, a plurality of normally closed mercoid switches in the said relay circuits adapted to be opened by the said plurality of manipulative devices, a signal-sequence changer having a number of selective arrangements of signal sequences comprising a plurality of gang switches equal to the said plurality of stimuli signals, relays, cam and cam switches, the said gang switches each having an adjustable contact and a number of selective positions equal to the said number of selective arrangements, a knob for moving the gang switches in unison to a pre-selected position, the said cam switches being sequentially connected to the adjustable contacts of the plurality of selective switches, and the said signal and clock relays and the said mercoid switches being connected in different sequences to each of the plural positions of the said selective switches, whereby adjustment of the knob to different positions provides different signal-sequences, the said cam switches being connected in individual circuits with the said signal and clock relays through the said changer whereby the said relays are energized and their associated command lamps lighted (and the corresponding alert lamps concurrently extinguished) in a sequence depending upon the setting of the said changer knob, and the said clock motion operated for a pre-determined time, each of the said manipulative devices being adapted to disrupt its associated holding circuit to de-energize the relays thereof and thereby to extinguish its associated command lamp (and to re-light the corresponding alert lamp) and to stop the clock whereby the latter registers the cumulative time the command lamps remain lighted.

14. In a device of the class described having a plurality of stimuli signals each comprising an alert lamp and a command lamp, a like plurality of manipulative devices required to be operated in response to the said command lamps and a clock, the combination of a camshaft, a control motor designed to impart a complete revolution thereto, a number of pairs of cams equal to the said plurality of stimuli signals and manipulative devices, each pair of cams comprising a starting cam provided with a short recess and a holding cam provided with a long recess, a plurality of switches closed by the said starting and holding cams, the said starting and holding cams being mounted on the said camshaft in stepped relation whereby the said plurality of cam switches are sequentially closed, a plurality of signal relays each controlling individual circuits to the alert and command lamps of one pair of stimuli signals, the circuit to the alert lamp being closed, and the circuit to the command lamp being open, in the de-energized condition of the associated signal relay, a plurality of clock controlling relays each in parallel with one of the said plurality of signal relays, a plurality of normally closed mercoid switches in the said relay circuits adapted to be opened by the said plurality of manipulative devices, a signal-sequence changer having a number of selective arrangements of signal sequences comprising a plurality of gang switches equal to the said plurality of stimuli signals, relays, cam and pairs of cam switches, the said gang switches each having a double adjustable contact and a number of pairs of selective positions equal to the said number of selective arrangements, a knob for moving the gang switches in unison to a pre-selected position, the said starting cam and holding cam switches being sequentially connected to the double adjustable contacts of the plurality of selective switches, and the said signal and clock relays and the said mercoid switches being connected in different sequence to each of the pairs of plural positions of the said selective switches, whereby adjustment of the knob to different positions provides different signal-sequences, the starting cam switches being connected in individual circuits with the said signal and clock relays through the said changer whereby the said relays are energized and their associated command lamps lighted (and the corresponding alert lamps concurrently extinguished) in a sequence depending upon the setting of the said changer knob, and the said clock solenoid energized to operate the clock hand clutch, the said holding cam switches being connected in the said individual holding circuits through the said changer whereby the said relays are held energized each for a pre-determined time, to maintain their respective command lamps lighted and the clock clutch solenoid energized for the said pre-determined time, each of the said manipulative devices being adapted to disrupt its associated holding circuit to de-energize the relays thereof and thereby to extinguish its associated command lamp (and to re-light the corresponding alert lamp) and to de-clutch the clock hand whereby the latter registers the cumulative time the command lamps remain lighted.

15. In a device of the class described having a plurality of stimuli signals each comprising an alert lamp and a command lamp, a like plurality of manipulative devices required to be operated in response to the said command lamps and a clock, the combination of a camshaft, a control motor designed to impart a complete revolution thereto, a number of cams equal to the said plurality of stimuli signals and manipulative devices mounted on the said camshaft in a stepped relation, a plurality of switches closed by the said cams, a plurality of signal relays each controlling individual circuits to the alert and command lamps of one pair of stimuli signals, the circuit to the alert lamp being closed, and the circuit to the command lamp being open, in the de-energized condition of the associated signal relay, the said clock having a motor and a clutch-connected hand, a solenoid for operating the clutch, a plurality of relays each in parallel with one of the said plurality of signal relays and connected to the said clock-hand clutch solenoid, a master holding cam on the said camshaft, a holding switch to the said control motor normally maintained in open condition by the said master holding cam, a manual starting switch adapted to supply current to the said motor causing the said master holding cam to close the said holding switch whereby current is supplied to the control motor for a complete revolution, the said clock motor being connected across the said holding switch whereby the clock motor is operated during the time the switch is closed, a holding circuit associated with each of the said plurality of signal and clock relays, a plurality of normally closed mercoid switches in the said individual holding circuits, adapted to be opened by the said plurality of manipulative devices, the said plurality of cam switches being in the said individual circuits whereby the said clock-hand solenoid is energized for a pre-determined time, each of the said manipulative devices being adapted to disrupt its associated holding circuit to de-energize the said clock relay and to de-clutch the clock hand whereby the latter registers the cumulative time the command lamps remain lighted, a clock resetting means, a solenoid to operate the same, and a manual resetting switch including a normally closed contact in the said clock-hand clutch solenoid and clock relay circuit and a normally opened contact in the said resetting solenoid circuit, whereby the two said circuits are never concurrently closed.

16. The combination according to claim 15 further provided with a cam mounted on the said camshaft, a switch controlled by the said cam provided in circuit with the clock resetting solenoid, whereby the clock hand is reset at the conclusion of the camshaft revolution.

17. In a device of the class described having a plurality of stimuli signals, a like plurality of manipulative devices required to be operated in response to the said signals, and a clock, the combination of a camshaft, a motor designed to impart a complete revolution thereto, a number of pairs of cams equal to the said plurality of stimuli signals and manipulative devices, mounted in stepped relation on the said camshaft, each pair of stepped cams comprising a starting cam provided with a short recess and a holding cam provided with a long recess, a plurality of switches closed by the said starting and holding cams, a plurality of signal relays each controlling an individual circuit to one of the said stimuli signals, the said signal circuits being closed upon the energization of their respective relay, the said starting cam switches being in individual circuits with the said signal relays whereby the said relays are sequentially energized and their associated signals sequentially lighted, a holding circuit associated with each of the said plurality of signal relays, the said holding cam switches being in the said individual holding circuits whereby the said relays are sequentially held energized each for a pre-determined time, to maintain their respective signals lighted, a plurality of normally closed mercoid switches opened by the said plurality of manipulative devices, in the said individual holding circuits whereby operation of a manipulative device disrupts its associated holding circuit to de-energize the relay thereof and to extinguish its associated stimuli signal.

18. In a device of the class described having a plurality of stimuli signals, a plurality of manipulative devices required to be operated in response to the said signals, and a clock, the combination of a camshaft, a motor designed to impart a complete revolution thereto, a number of cams equal to the said plurality of stimuli signals and manipulative devices mounted in stepped relation on the said camshaft, a plurality of switches controlled by the said cams, a plurality of signal relays individually associated with the said plurality of stimuli signals, a plurality of mercoid switches individually associated with the said plurality of manipulative devices, the said cam switches being in individual circuits with the said signal relays whereby the said relays are sequentially energized for a pre-determined period, a holding circuit associated with each of the said plurality of signal relays, the said plurality of mercoid switches being in the said individual holding circuits whereby operation of the associated manipulative device disrupts its associated holding circuit to de-energize its relay and to extinguish its associated stimuli signal.

19. In a device of the class described having a plurality of stimuli signals, a like plurality of manipulative devices required to be operated in response to the said signals, and a clock, the combination of a camshaft, a motor designed to impart a complete revolution thereto, a number of cams equal to the said plurality of stimuli signals and manipulative devices mounted in stepped relation on the said camshaft, a plurality of switches closed by the said cams, a plurality of relays each controlling an individual circuit to one of the said stimuli signals, the said signal circuits being closed upon the energization of their respective relays, a plurality of signal relays each in parallel with one of the said plurality of signal relays, controlling the said clock, the said cam switches being in individual circuits with the said signal relays and the said clock relays whereby the said relays are sequentially energized and their associated signals sequentially lighted and the said clock sequentially operated for a pre-determined period, a holding circuit associated with each of the said plurality of signal and clock relays, a plurality of normally closed mercoid switches in the said individual holding circuits opened by the said plurality of manipulative devices whereby operation of a manipulative device disrupts its associated holding circuit to de-energize the relay thereof and to extinguish its associated stimuli signal and to stop the operation of the clock.

20. In a device of the class described having a plurality of stimuli signals, a like plurality of manipulative devices required to be operated in response to the said signals, and a clock, the combination of a camshaft, a motor designed to impart a complete revolution thereto, a number of cams equal to the said plurality of stimuli signals and manipulative devices, a plurality of switches closed by the said cams, the said cams being mounted on the said camshaft in stepped relation whereby the said plurality of cam switches are sequentially closed, a plurality of signal relays each controlling an individual circuit to one of the said stimuli signals, the said signal circuits being closed upon the energization of their respective relay, a holding circuit associated with each of the said plurality of signal relays, a plurality of normally closed mercoid switches in the said individual holding circuits opened by the said plurality of manipulative devices, a signal-sequence changer having a number of selective arrangements of signal sequences interposed between the said plurality of cam switches and the said plurality of signal relays and mercoid switches, the cam switches being connected in individual circuits with the said relay signals through the said changer whereby the said relays are energized and their associated signals lighted in a sequence depending upon the setting of the said changer for a pre-determined time, the said manipulative devices being adapted to disrupt its associated holding circuit to deenergize the relay thereof and to extinguish its associated stimuli signal.

SAMUEL P. BROWN.